(12) United States Patent
Phillips et al.

(10) Patent No.: US 11,645,690 B2
(45) Date of Patent: May 9, 2023

(54) INTERMEDIATE MENU, VISUAL DESIGN TEMPLATE, AND INTERACTIVE LABEL

(71) Applicant: PepsiCo, Inc., Purchase, NY (US)

(72) Inventors: John S. Phillips, Purchase, NY (US); Gregory Buckley, Purchase, NY (US); William Reeves, Purchase, NY (US)

(73) Assignee: PepsiCo, Inc., Purchase, NY (US)

( * ) Notice: Subject to any disclaimer, the term of this patent is extended or adjusted under 35 U.S.C. 154(b) by 148 days.

(21) Appl. No.: 17/008,120

(22) Filed: Aug. 31, 2020

(65) Prior Publication Data

US 2021/0065272 A1 Mar. 4, 2021

Related U.S. Application Data

(60) Provisional application No. 62/894,770, filed on Aug. 31, 2019.

(51) Int. Cl.
| | | |
|---|---|---|
| *G06Q 30/06* | (2023.01) | |
| *G06Q 30/0601* | (2023.01) | |
| *G06F 9/451* | (2018.01) | |
| *G06F 3/0482* | (2013.01) | |
| *G06K 7/14* | (2006.01) | |

(Continued)

(52) U.S. Cl.
CPC ....... *G06Q 30/0623* (2013.01); *G06F 3/0482* (2013.01); *G06F 9/451* (2018.02); *G06K 7/1417* (2013.01); *G06Q 20/18* (2013.01); *G06Q 20/208* (2013.01); *G06Q 20/3276* (2013.01); *G06Q 30/0185* (2013.01)

(58) Field of Classification Search
CPC .. G06Q 30/02; G06Q 10/087; G06Q 30/0601; G06Q 20/32; G06Q 30/0623; G06Q 20/208; H04W 4/80; G06F 9/451; G06F 3/0482
See application file for complete search history.

(56) References Cited

U.S. PATENT DOCUMENTS

| | | | | |
|---|---|---|---|---|
| 8,577,734 B2 * | 11/2013 | Treyz | .................. | G06Q 20/343 705/26.1 |
| 10,380,174 B2 * | 8/2019 | Bhagwan | .............. | G06F 16/242 |

(Continued)

FOREIGN PATENT DOCUMENTS

EP 2765551 8/2014

OTHER PUBLICATIONS

International Search Report and Written Opinion issued in PCT/US2020/048801 dated Nov. 17, 2020.

(Continued)

*Primary Examiner* — Florian M Zeender
*Assistant Examiner* — Milena Racic
(74) *Attorney, Agent, or Firm* — Barnes & Thornburg LLP; Dominic Yobbi

(57) ABSTRACT

According to one aspect of the present disclosure, a method of delivering a self-directed user experience includes encoding access to an intermediate menu in at least one matrix bar code, developing an intermediate menu that facilitates a self-directed user experience, and presenting the at least one matrix bar code to a user via placement on a product. Further in accordance with this aspect, the method may include directing the user to the intermediate menu via the at least one matrix bar code such that the self-directed user experience is responsive to user interaction with intermediate menu.

18 Claims, 17 Drawing Sheets

(51) Int. Cl.
     *G06Q 20/18*      (2012.01)
     *G06Q 20/20*      (2012.01)
     *G06Q 20/32*      (2012.01)
     *G06Q 30/018*     (2023.01)

(56)           References Cited

U.S. PATENT DOCUMENTS

| | | |
|---|---|---|
| 10,528,312 B2 * | 1/2020 | Reeves .................. G06F 3/041 |
| 2014/0279242 A1 * | 9/2014 | Staicut ............... G06Q 30/0623 |
| | | 705/26.61 |
| 2015/0112838 A1 | 4/2015 | Li et al. |
| 2018/0033016 A1 | 2/2018 | Mayman et al. |
| 2019/0065009 A1 * | 2/2019 | Savage .................. G06F 9/451 |
| 2019/0197278 A1 * | 6/2019 | Kastury ........... G06K 19/06178 |
| 2021/0406040 A1 * | 12/2021 | Kuduvalli ............... G06F 9/451 |

OTHER PUBLICATIONS

International Preliminary Report on Patentability dated Mar. 1, 2022, in PCT/US2020/048801.

\* cited by examiner

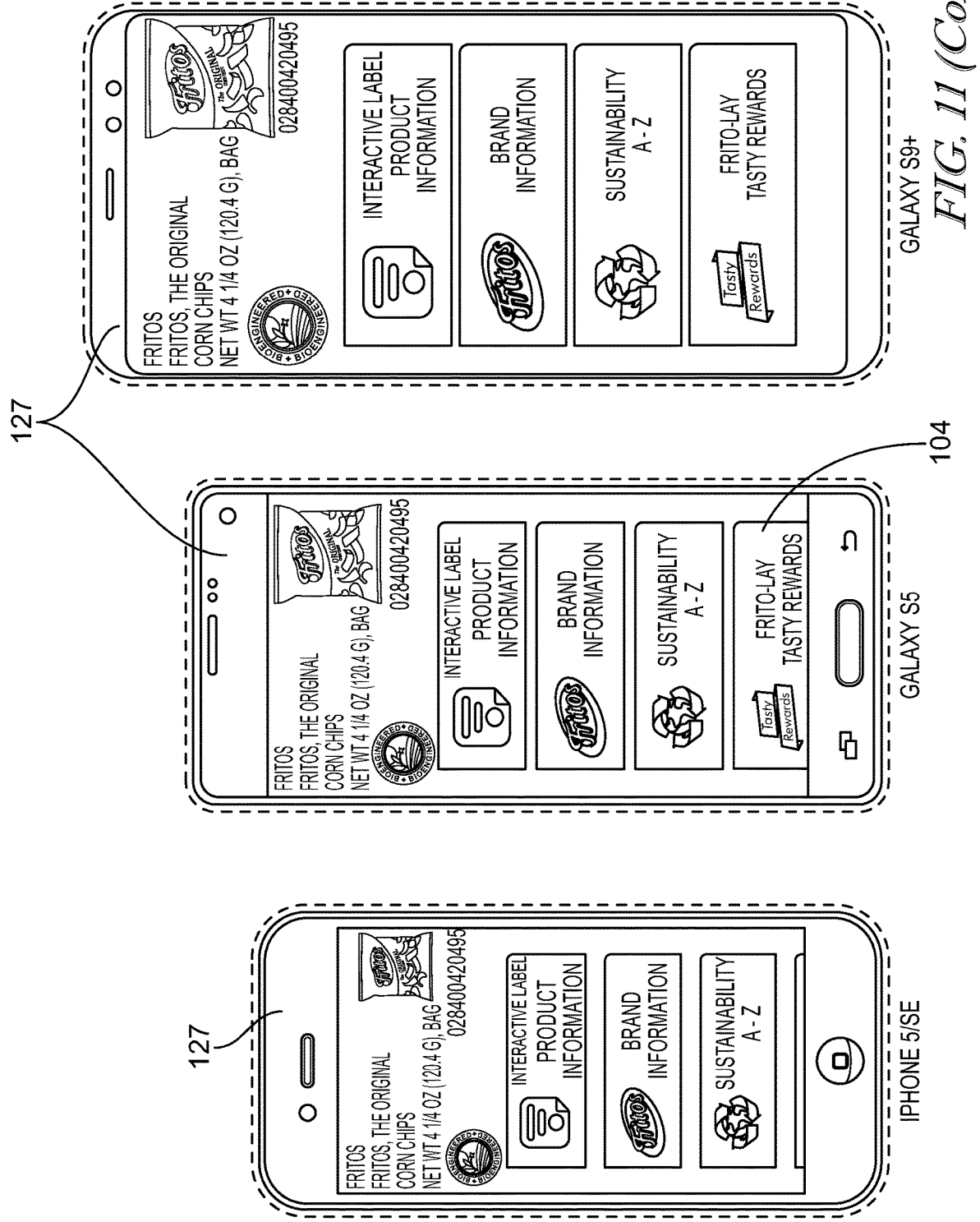

INTERMEDIATE MENU, VISUAL DESIGN TEMPLATE, AND INTERACTIVE LABEL

CROSS REFERENCE TO RELATED APPLICATION[S]

This application claims the benefit of U.S. provisional patent application No. 62/894,770, filed Aug. 31, 2019, and entitled "INTERMEDIATE MENU, VISUAL DESIGN TEMPLATE, AND SMART LABEL", the entire disclosure of which is hereby incorporated by reference herein.

TECHNICAL FIELD

The present subject matter relates to product labelling, and more particularly, to interactive labelling such as may incorporate matrix bar codes.

BACKGROUND

Matrix bar codes (or two-dimensional bar codes) have become common in consumer advertising and are often referred to as quick response (QR) codes. A bar code is a machine-readable optical label that contains information often associated with an item to which the bar code is affixed; however, QR codes may be used for more wide-ranging applications. Conventionally, QR codes encode data for a locator, identifier, or tracker that points to a single, specific website or application. QR codes use four standardized encoding modes (numeric, alphanumeric, byte/binary, and kanji) to store data. Further, QR codes may vary in size and the quantity of encoded data.

Typically, an optical/image sensor (e.g., camera) of a smartphone or other mobile device is used as a QR code scanner. Once scanned by a mobile device, the information encoded by the QR code may be converted into another intended format such as a standard URL for a website. A website or application is automatically accessed and/or downloaded in response to scanning of the QR code resulting in convenience and efficient transfer of information to the scanner of the QR code. Visually, a QR code comprises black squares arranged in a square grid on a white background, but other contrasting colors may also be appropriate. The QR code is processed using Reed-Solomon error correction until the image is interpreted. The encoded data is then extracted from patterns that are present in both horizontal and vertical components of the matrix bar code.

Conventionally, although convenient, website access and/or application download facilitated by a QR code has not allowed for a self-directed user experience. Systems and methods for facilitating a self-directed user experience initiated by scanning a matrix bar code would represent an improvement in the art.

The description provided in the background section should not be assumed to be prior art merely because it is mentioned in or associated with the background section. The background section may include information that describes one or more aspects of the subject technology.

SUMMARY

According to one aspect of the present disclosure, a method of delivering a self-directed user experience includes encoding access to an intermediate menu in at least one matrix bar code, developing an intermediate menu that facilitates a self-directed user experience, and presenting the at least one matrix bar code to a user via placement on a product. Further in accordance with this aspect, the method may include directing the user to the intermediate menu via the at least one matrix bar code such that the self-directed user experience is responsive to user interaction with intermediate menu.

According to another aspect of the present disclosure, a system for implementing a self-directed user experience may include at least one matrix bar code corresponding to a product, and at least one computing device comprising at least one optical sensor such that the at least one matrix bar code is readable by the at least one optical sensor. Additionally, the system includes an intermediate menu comprising product information and at least one virtual button such that the at least one computing device displays the intermediate menu in response to reading the at least one matrix bar code.

Yet another aspect of the present disclosure describes an intermediate menu system including a data carrier corresponding to an intermediate menu such that the intermediate menu is accessible by detecting the data carrier with at least one sensor and wherein the intermediate menu facilitates a self-directed user experience. Also, according to this aspect, the system includes a product associated with the intermediate menu such that the data carrier is integrated into at least one of the product and a product package, and a mobile device including the at least one sensor and configured to detect the data carrier and present the intermediate menu.

Other aspects and advantages of the present disclosure will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Figure 1:
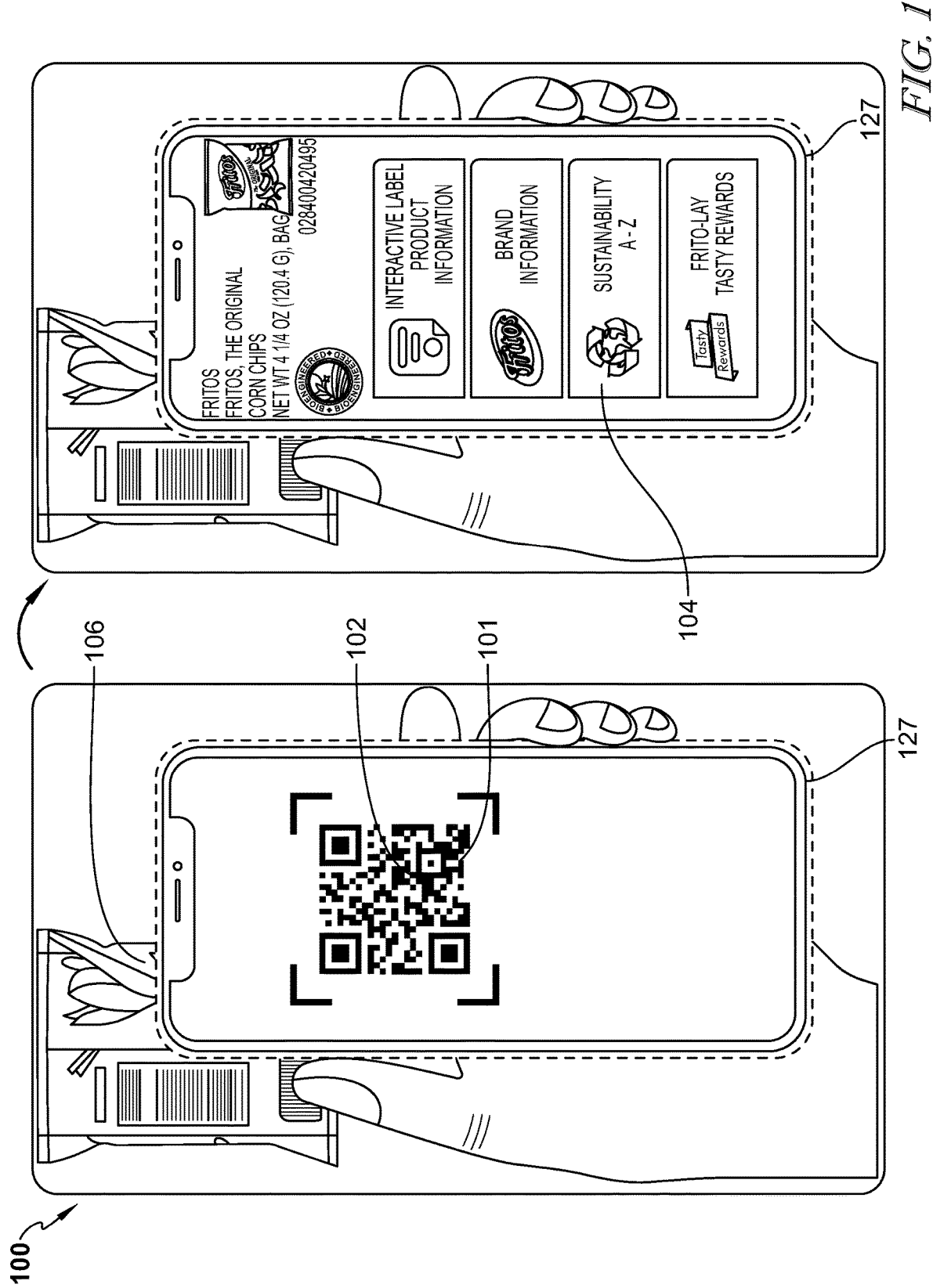
FIG. 1 illustrates an exemplary matrix bar code that redirects a user to an intermediate menu.

Generally, the present disclosure details, with reference to FIGS. 1-14, a system and method 100 for directing a user to an intermediate menu by a data carrier 101 (e.g., a matrix bar code). In FIG. 1, the data carrier 101 is illustrated as a matrix bar code 102, e.g., a Quick Response (QR) code, that redirects a user to an intermediate menu 104. According to exemplary embodiments, a user may scan the matrix bar code 102 associated with, e.g., printed on or applied to the packaging or product 106, a particular product 107 (see FIGS. 2A-2C). The matrix bar code 102 may be scanned using an image sensor, e.g., camera, through a camera application or another dedicated bar code scanning application, integrated into a mobile device 127. Once scanned, information encoded by the matrix bar code 102 directs the user to an intermediate menu 104. In some embodiments, the intermediate menu 104 displays consolidated product information and/or navigational buttons re-directing to additional product information, interactive label product information (e.g., SmartLabel®), advertising, re-order information, brand information, sustainability information, information concerning bioengineering, information concerning inspections and/or certifications from the U.S. Department of Agriculture, loyalty and/or rewards program information, navigational buttons re-directing to partner websites, navigational buttons re-directing to brand websites and/or promotional websites, navigational buttons re-directing to nutritional information, and/or to other suitable information and/or navigational buttons re-directing a user according to one or more hyperlinks.

Underlying hyperlinks 112 of the intermediate menu 104 may be interactively displayed as one or more virtual buttons 110 on a digital display 120, such as a mobile device display. Text and/or images describing each of the underlying hyperlinks 112 and/or other information associated with the virtual buttons 110 may be displayed on or about each of the virtual buttons 110. Accordingly, a user may be presented with multiple digital experiences through use of the single matrix bar code 102 associated with or provided as part of the product packaging 106, the product 107, or other materials accompanying the product. For example, the matrix bar code 102 may be disposed on the product 107, the packaging 106, and/or an insert accompanying the product 107. In further examples, the matrix bar code 102 directing a user to the intermediate menu 104 may be disposed amongst traditional advertising, print advertising, on a product display (e.g., an end cap), clothing, digital product displays, retailer websites and/or other suitable websites such as brand-associated websites, other suitable in-store displays, shelf tag (e.g., printed or digital shelf tags), hard goods (e.g., washing machine) other products, displayed by a digital display or another computing resource associated with a product (e.g., the matrix bar code 102 may be displayed on a first mobile device for scanning by a second mobile device, such as for sharing between devices), and/or displayed in connection with social media.

Figure 2B:
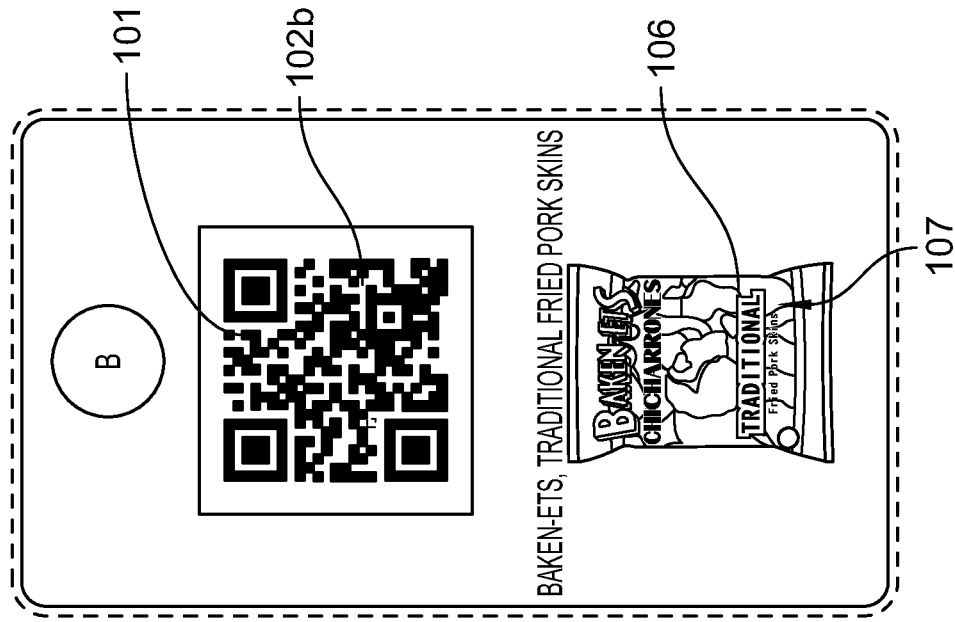
FIGS. 2A and 2B illustrate exemplary matrix bar codes that correspond to particular products A and B and that may be placed on packaging associated with such particular products.
Figure 2A:
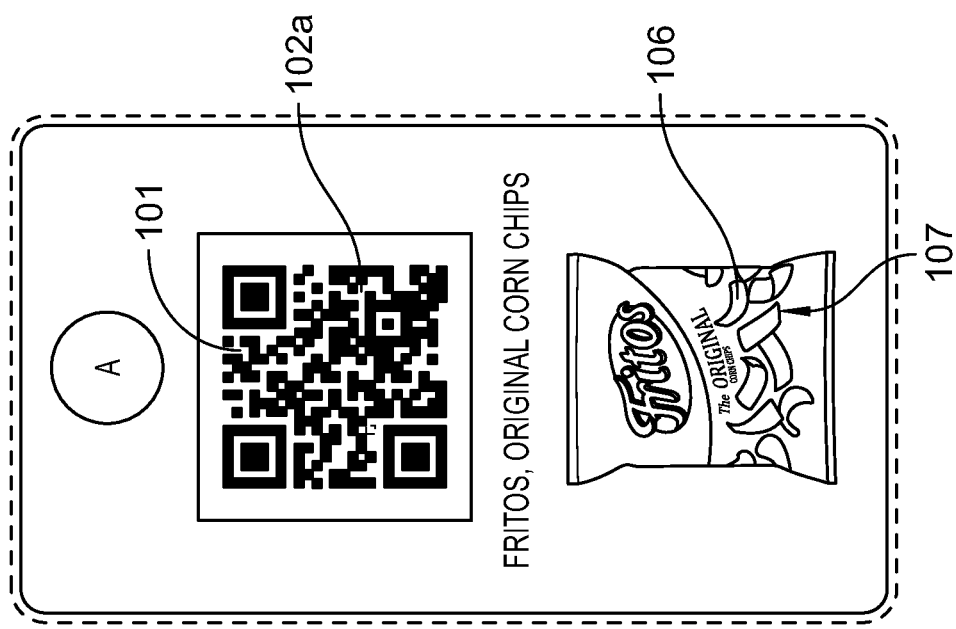
Figure 2C:
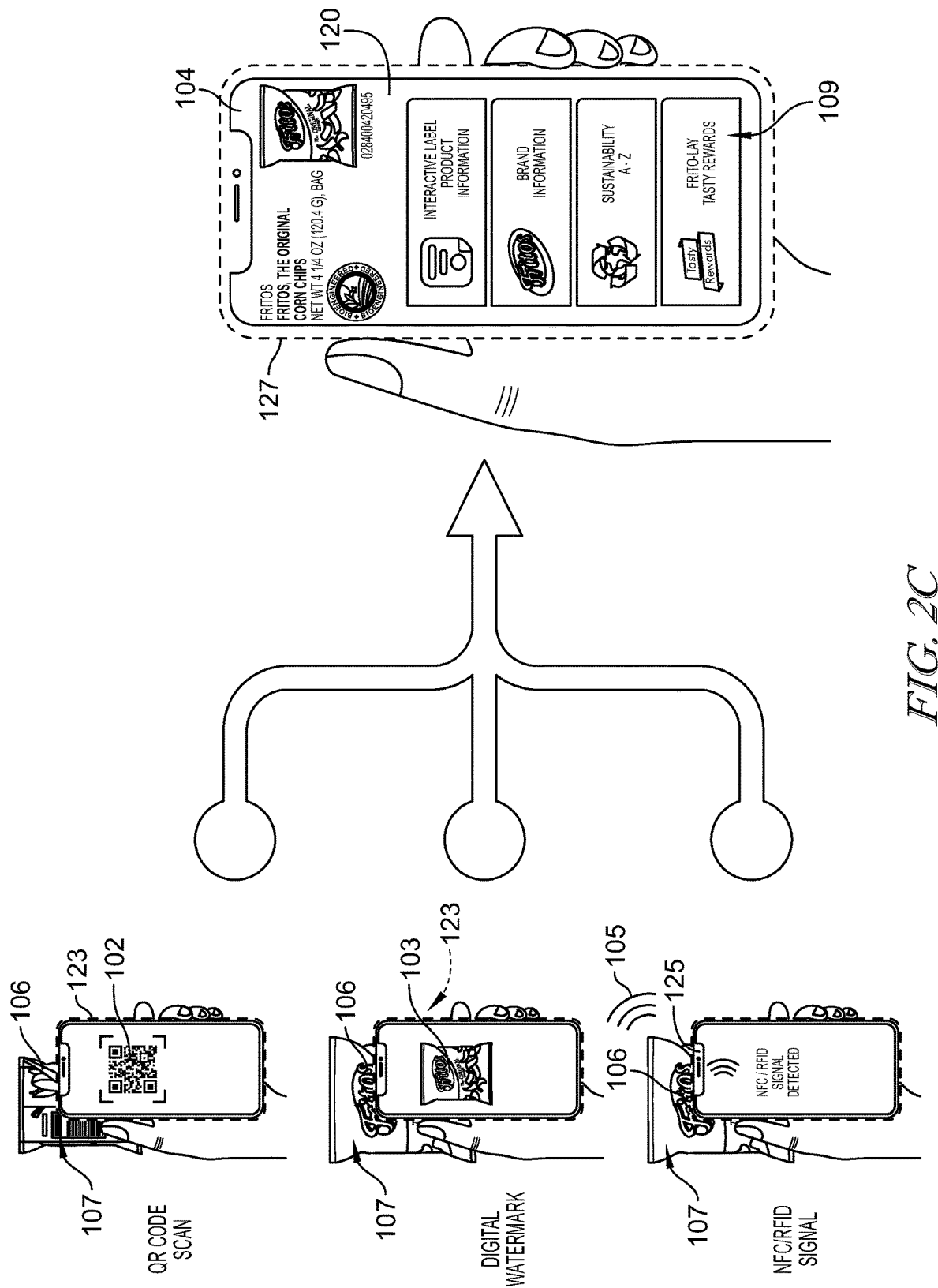
FIG. 2C illustrates examples of a data carrier that may be placed on packaging associated with particular products and an exemplary intermediate menu.

Referring now to FIGS. 2A and 2B, examples of the matrix bar code 102a, 102b correspond to particular products A and B and may be associated with and/or placed on packaging for these particular products. However, additional examples of the data carrier 101 of the system and method 100 are illustrated in FIG. 2C. The data carrier 101 may comprise the matrix bar code 102, a digital watermark 103, and/or an NFC, Bluetooth® or RFID signal 105 (such as might be transmitted from a low power device embedded in packaging or within an exemplary product). For ease of reference in the following description, the example of the data carrier 101 referred to and illustrated is the matrix bar code 102; but one of skill will understand that, unless the context specifically calls for use of the matrix bar code 102 other suitable embodiments of the data carrier 101 may be substituted for and/or combined with the matrix bar code 102. The data carrier 101 may be associated with, e.g., printed on and/or embedded in packaging of a subject product or on the subject product itself. In an example, an NFC/RFID transmitter and/or a Bluetooth® beacon may be embedded within a carton of beverages and may be read by a mobile device radio sensor/antenna 125. In still another example, the digital watermark 103 may be incorporated into the trade dress or art displayed on a package. In exemplary embodiments, the digital watermark 103 may be conspicuous and distinct from other images or art displayed on product packaging. In alternative examples, the digital watermark 103 may be integrated into packaging art or a component of packaging art may itself comprise the digital watermark 103.

Figure 3:
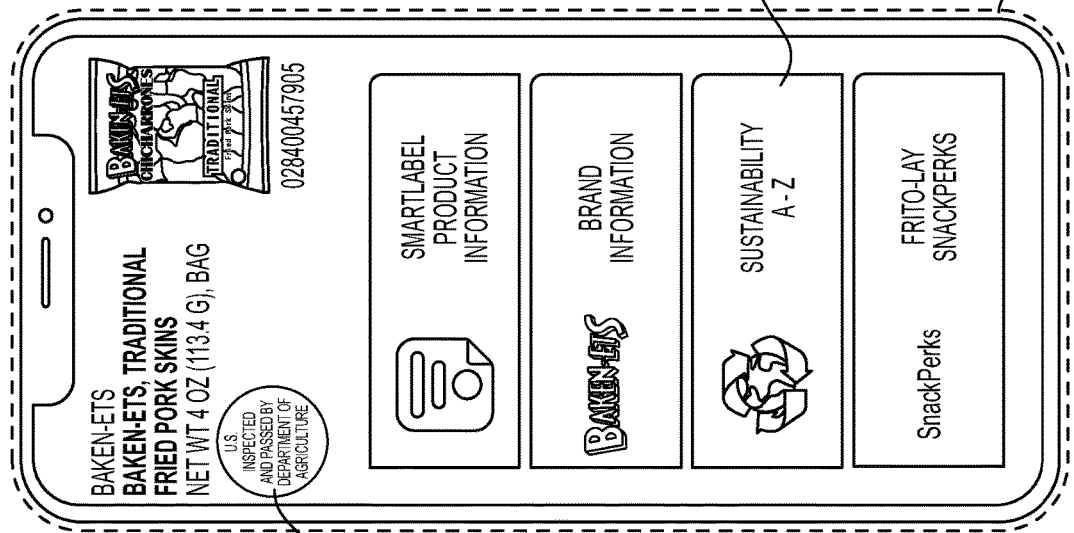
FIG. 3 illustrates exemplary intermediate menus that correspond to the particular products A and B and the associated matrix bar codes as shown in FIG. 2.
Figure 3:
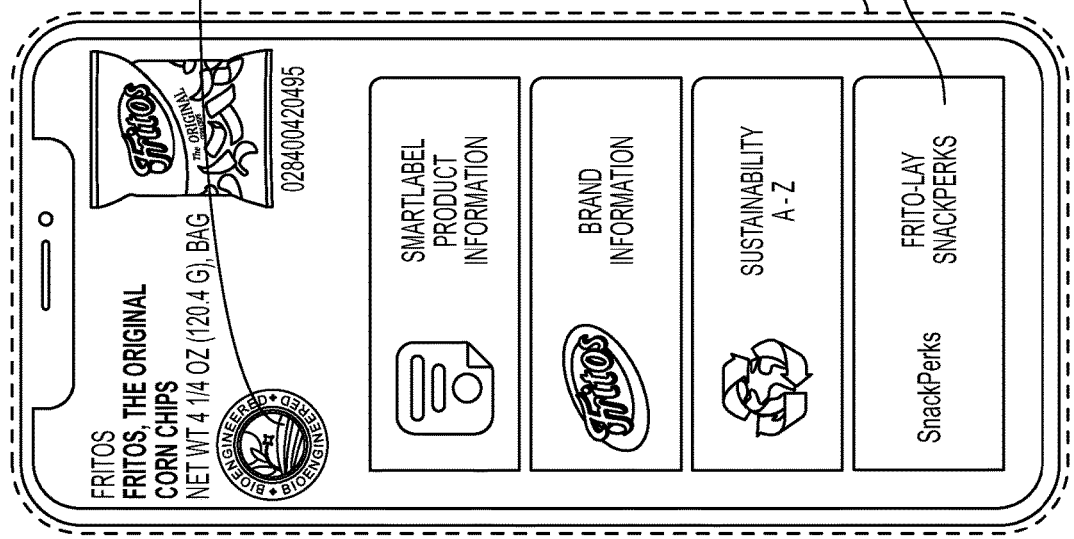
Figure 4:
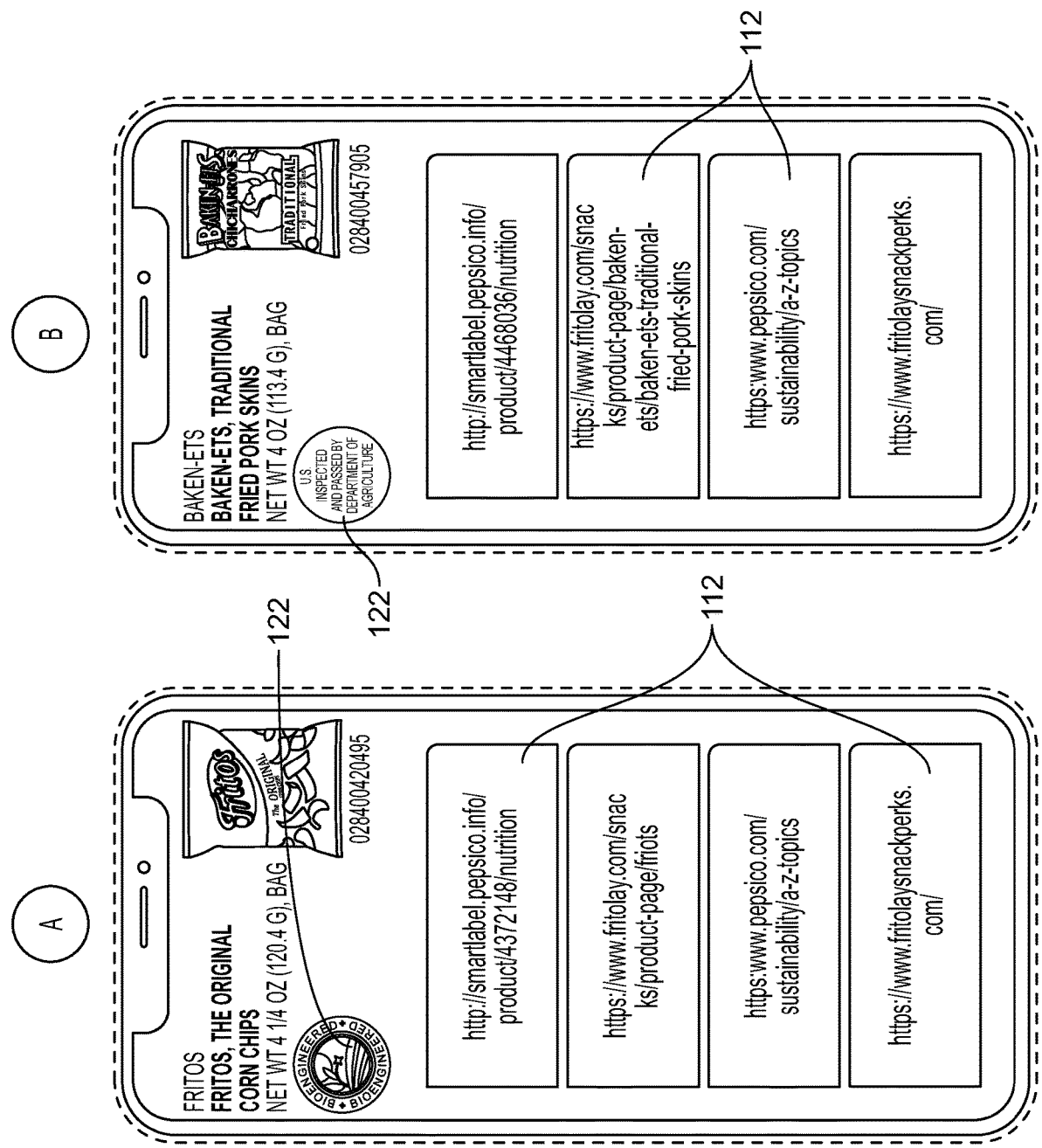
FIG. 4 illustrates the exemplary intermediate menus of FIG. 3 and underlying hyperlinks corresponding to the particular products A and B.

In FIG. 3, examples of the intermediate menus 104a, 104b corresponding to the particular products A and B and the associated matrix bar codes 102a, 102b are shown. FIG. 4 illustrates the exemplary intermediate menus 104a, 104b of FIG. 3 and one or more exemplary underlying hyperlinks 112 corresponding to the particular products A and B. The virtual buttons 110 of FIG. 4 omit anchor text and/or images 114 (see FIG. 3) that may typically be associated with the underlying hyperlinks 112. The presently described system and method 100 enables modification and customization of the underlying hyperlinks 112 separately or in conjunction with modification of anchor text and/or images. Additionally, according to some embodiments, as information regarding a product changes, the intermediate menu 104 may be updated without changing the matrix bar code 102. Therefore, if the matrix bar code 102 is printed on or affixed to the packaging 106 of a particular product, e.g., a matching matrix bar code printed on packaging of Fritos™ Original Corn Chips™, when information changes for that product, the intermediate menu 104 may be quickly and easily updated without re-printing and/or updating of the matrix bar code 102 already in circulation on the product packaging 106.

Figure 5:
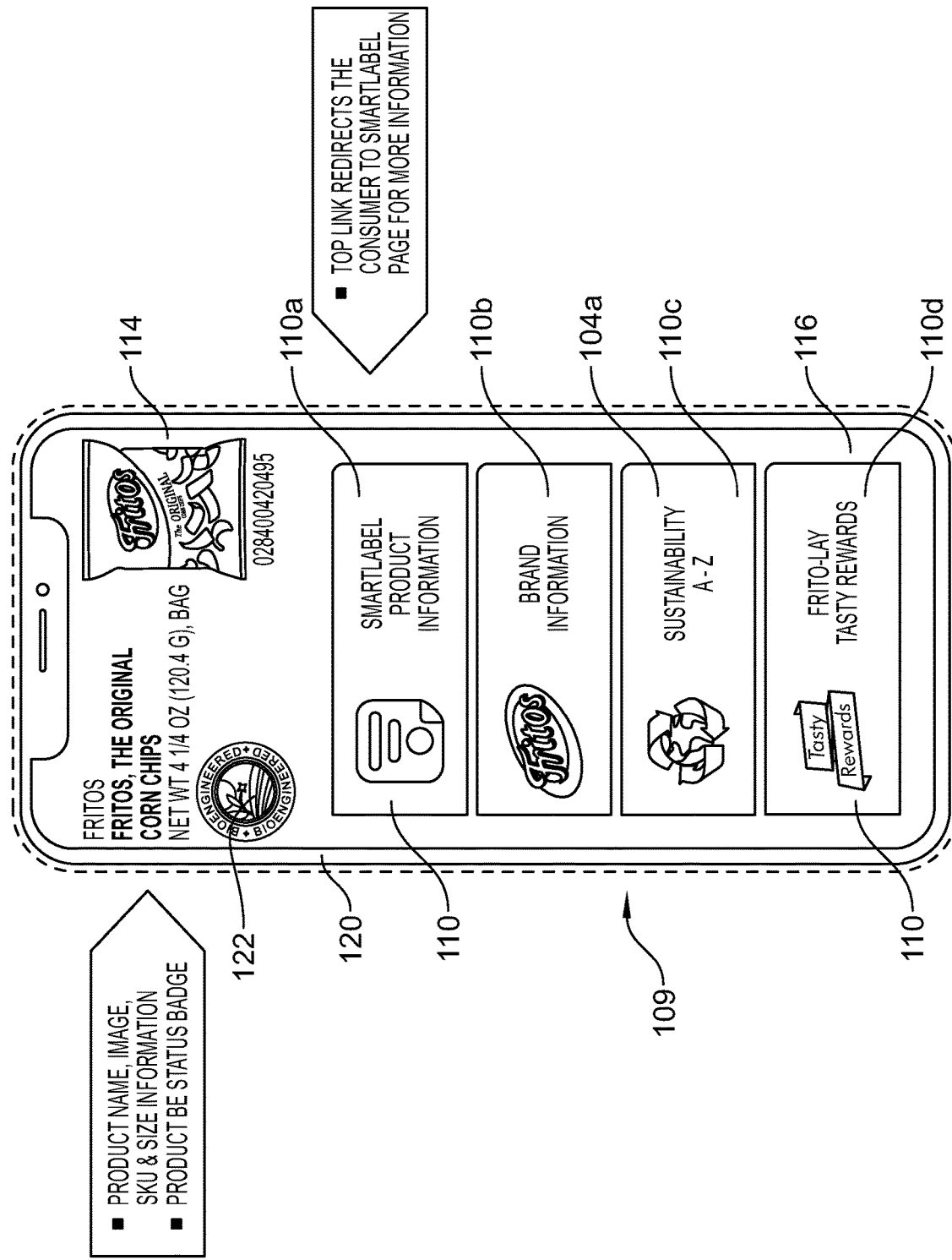
FIGS. 5 and 6 illustrate another example of the intermediate menu corresponding to the particular product A.
Figure 6:
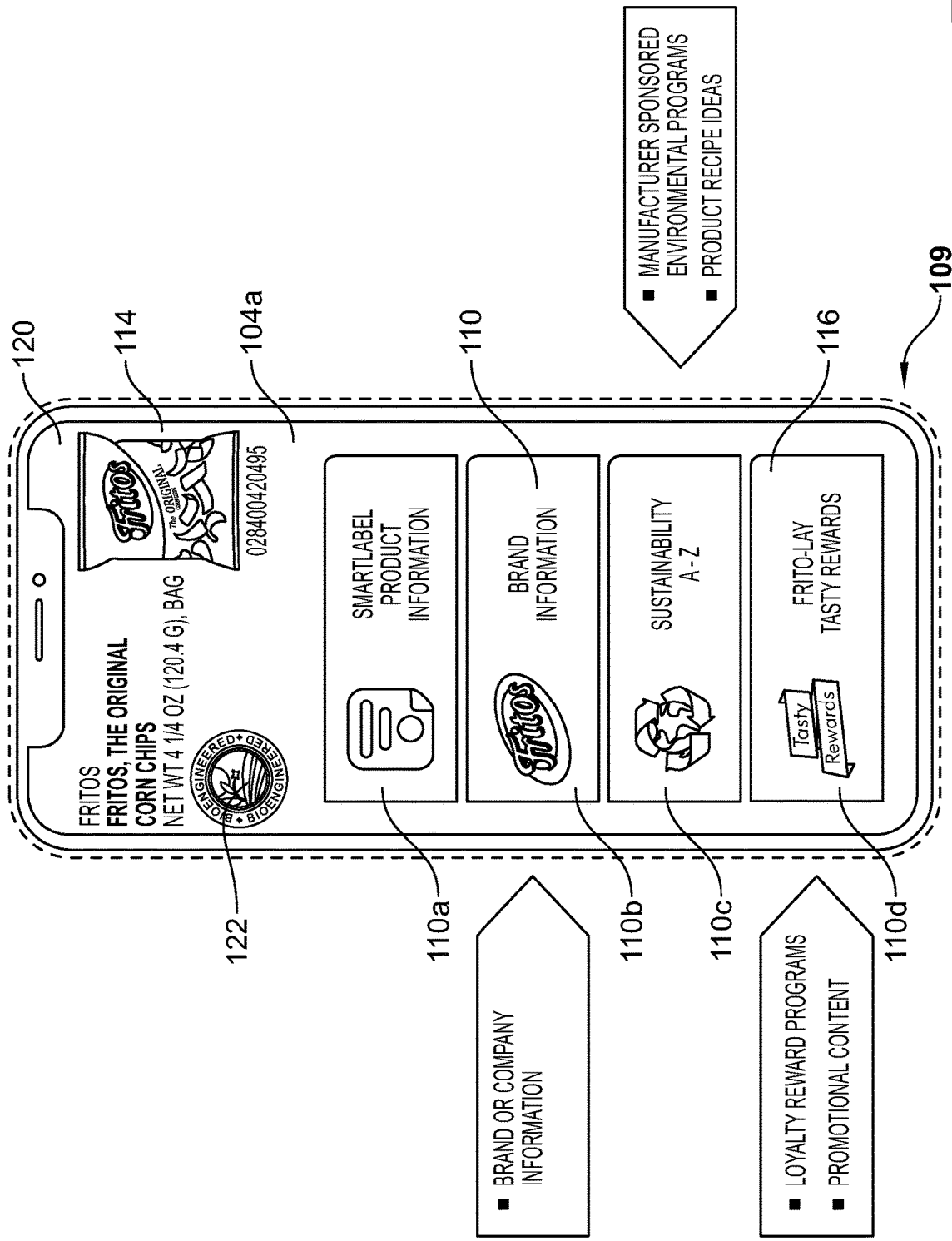
Figure 7:
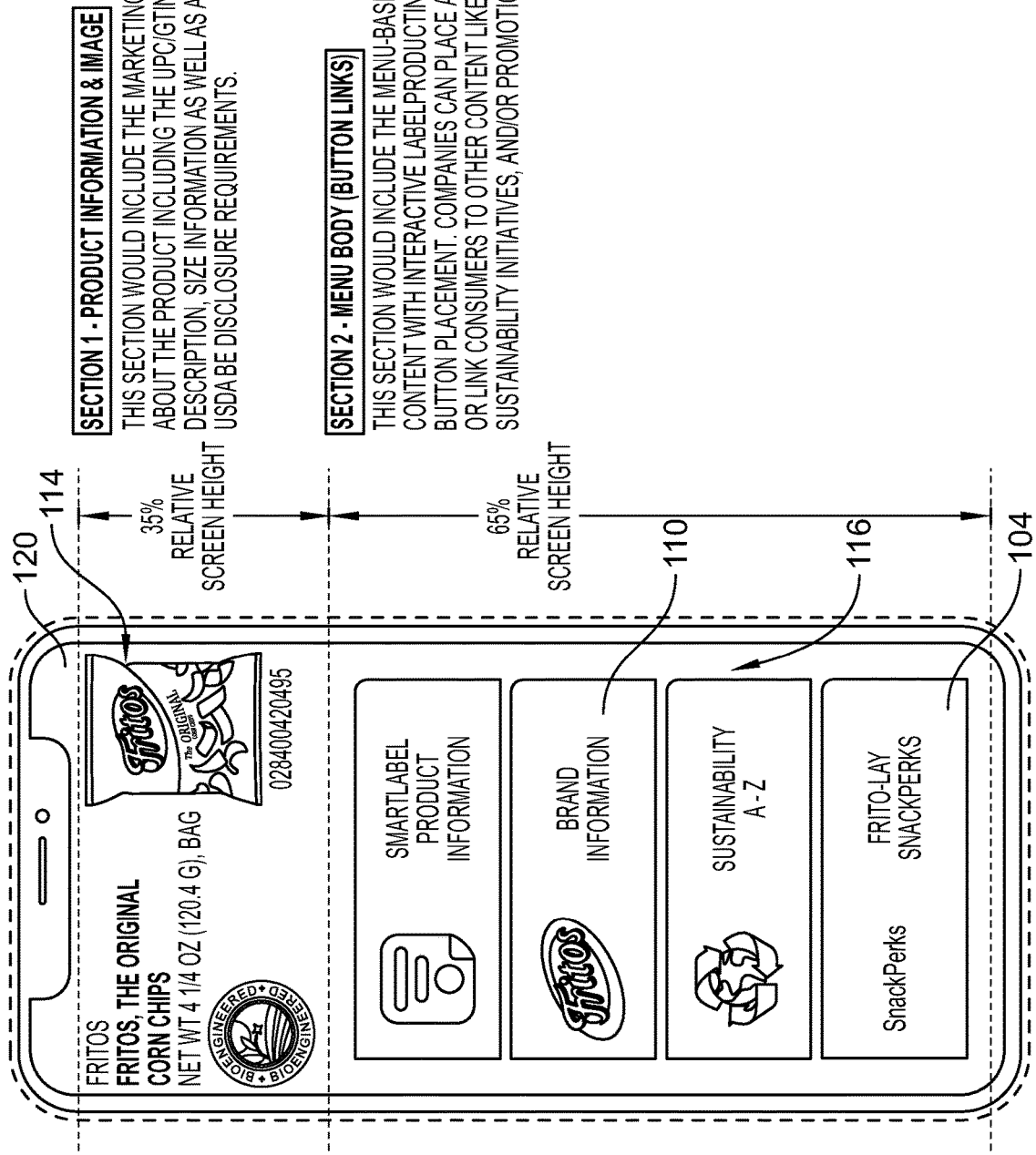
FIG. 7 diagrams the intermediate menu shown in FIGS. 5 and 6 to further detail first and second sections of the intermediate menu.

FIGS. 5 and 6 show an example of the intermediate menu 104a corresponding to the particular product A, i.e., Fritos® Original Corn Chips™. FIG. 7 diagrams the intermediate menu 104 shown in FIGS. 5 and 6 to further detail first and second sections 114, 116 of a visual design template or layout 109 that arranges the intermediate menu 104. The first section 114 comprises product information while the second section 116 comprises one or more virtual buttons 110 and one or more of the underlying hyperlinks 112. The first section 114 may present product information such as product name, product image, product stock keeping unit identifier (e.g., UPC, EAN, and/or GTIN number), product package size information, product bioengineering status badge(s), genetically modified (GMO) food status badge(s), and/or U.S. Department of Agriculture status information. In some embodiments, product information is presented to a user on the intermediate menu 104 without additional user input or interaction and/or an opt-in/opt-out selection may be presented to a user before initiating the user directed experience. Accordingly, product information may be presented even to a passive user that does not otherwise desire to interact with the intermediate menu 104 or chooses not to interact with the intermediate menu 104 after having accessed the intermediate menu 104. In other embodiments, it may be desirable to present this product information before a user navigates through any marketing and/or promotional materials. For instance, a bioengineering status badge 122 may be suitable for presentation to a user in the absence of promotional materials and/or advertising. Similarly, referring ahead to FIG. 15, model number and serial number for appliances, housewares, etc. or size and fit information for clothing items may be suitable for presentation to a user in the absence of promotional materials and/or advertising.

Referring still to FIGS. 5-7, the second section 116 supplies a user with a self-directed experience for accessing and exploring additional product information and product and/or brand related content such as via an interactive label. In the illustrated example of the intermediate menu 104, a first virtual button 110a directs a user to an interactive label (e.g., a SmartLabel® Page) for more information regarding the associated product. A second virtual button 110b directs a user to additional brand information; in this example, to Fritos® brand information. The second virtual button 110b may be disposed vertically below the first virtual button 110a on the mobile device display 120. A third virtual button 110c may be disposed vertically below the second virtual button 110b. In this example, the third virtual button 110c directs a user to manufacturer sponsored environmental programs and/or additional information regarding sustainability practices relating to the product and/or product packaging. Still further, a fourth virtual button 110d may be disposed vertically below the third virtual button 110c along the mobile device display 120. The fourth virtual button 110d directs a user to promotional content and/or loyalty rewards program information.

Figure 15:
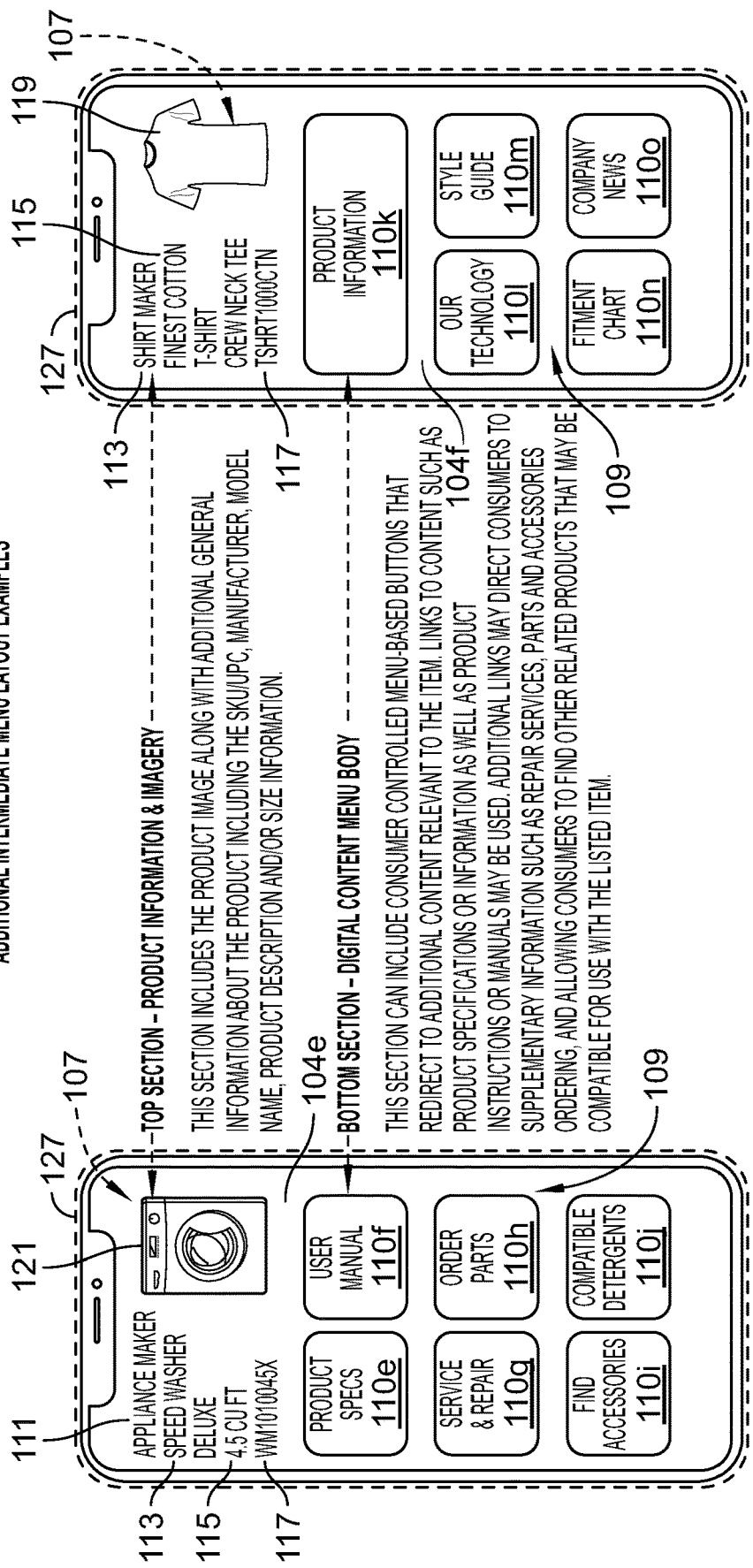
FIG. 15 illustrates exemplary intermediate menus that correspond to exemplary products C and D and associated data carriers similar to those shown in FIGS. 2A, 2B, and 2C.

More virtual buttons or fewer virtual buttons may be included in the second section 116 (see also FIG. 15). The number of the virtual buttons 110 may be dynamically determined by a number of the underlying hyperlinks 112. Further, the virtual buttons 110 may be arranged according to different patterns with varying button sizes. In some embodiments, it may be desirable to designate a minimum button size, such as a height of 100 pixels, in order to maintain readability and a desirable and/or standardized appearance. In an exemplary embodiment, the virtual buttons 110 may be disposed in a grid pattern. Additionally, user interaction with the virtual buttons 110 may be the same or may vary, e.g., the virtual buttons 110 may be pressed, hovered over, swiped (left, right, up, and/or down), and/or otherwise interacted with, to customize the user-directed experience according to differing criteria. While the illustrated embodiment shows the virtual buttons 110 disposed within the second section 116 of the intermediate menu 104, one or more of the virtual buttons 110 may alternatively or additionally be disposed within the first section 114. In some instances, the intermediate menu 104 may comprise more or fewer sections than the illustrated first and second section 114, 116. Embodiments may include additional interactive sections or separate promotional, social media, and/or frequently updated information into another section so as to more easily maintain appearance of the intermediate menu 104 when displayed and/or to draw user attention to updated information or virtual buttons.

Figure 8:
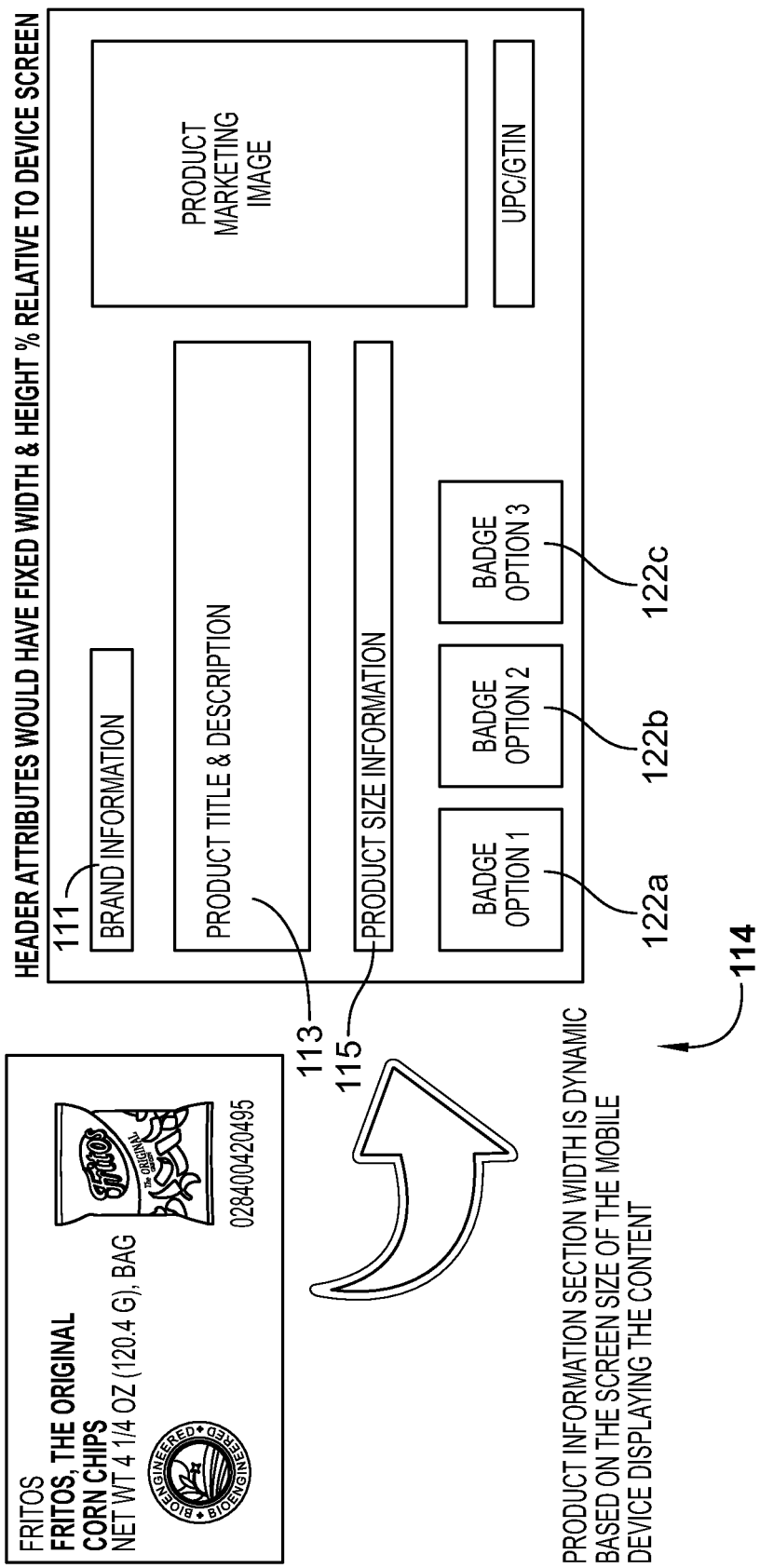
FIG. 8 is an enlarged view of the first section of the intermediate menu further detailing information shown in the first section.
Figure 9:
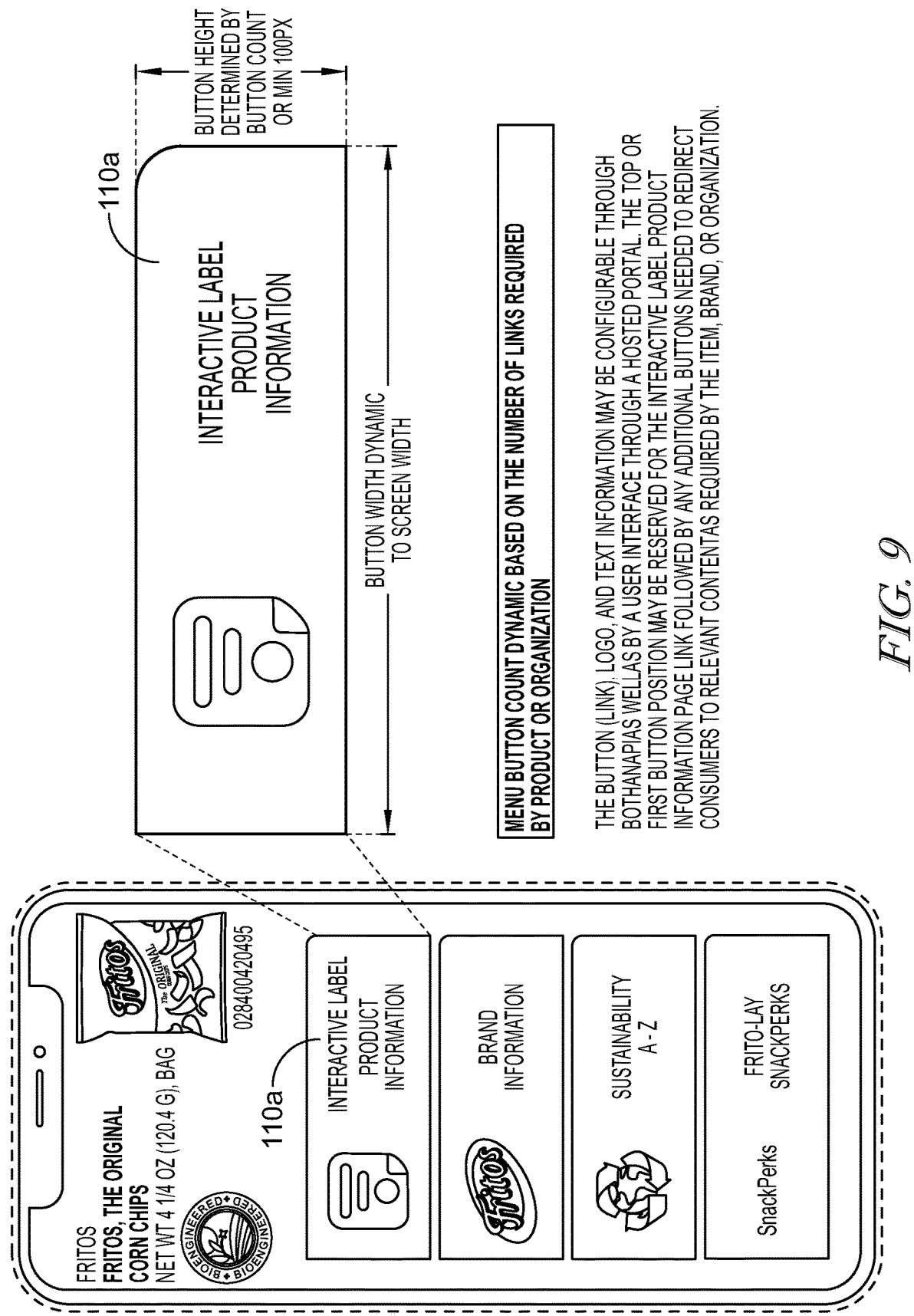
FIG. 9 is an enlarged view of a virtual button of the intermediate menu.

Referring now to FIG. 8, an enlarged view of the first section 114 of the intermediate menu 104 shows further layout details of the first section 114. Header attributes may have a fixed height and width relative to a particular display screen size, while a height and width of the first section 114 may be dynamically determined based on the size of a display screen that displays the intermediate menu 104. Components of this section may be easily updated without changing the matrix bar code 102, including badge options 122a, 122b, 122c. In the illustrated example, only one badge option (i.e., a bioengineering status badge) is selected and displayed. Additional badge options may be selected and alternatively or additionally displayed. For example, an organic status badge or another badge designating certifications from the U.S. Department of Agriculture may be easily selected, switched, and/or customized depending upon a status of the product. FIG. 9 is an enlarged view of the first virtual button 110a of the intermediate menu 104. The virtual buttons 110 may be dynamically sized depending upon a size of the display screen implementing the intermediate menu 104 and/or the number of links desired for a product and/or organization. Sizes and shapes of the virtual buttons 110 may further be dynamically adjusted based on other priorities of a product manufacturer and/or marketer and the number and sizes of other sections of the intermediate menu 104 being simultaneously displayed.

The anchor logo and text information as well as the underlying hyperlink(s) 112 of the one or more virtual buttons 110 may be configurable through an application programming interface (API) and/or a custom user interface (UI) presented through a hosted portal. In some embodiments, to standardize the intermediate menu 104 across an organization or industry, the first virtual button 110a may be reserved for the interactive label product information page link (e.g., SmartLabel®) followed by any additional buttons for directing users to relevant content as desired for the item, brand, and/or organization. FIG. 8 also illustrates layout details for including brand information 111, product identification 113, and product size information 115 (see also FIG. 15). These features may be customizable dependent upon a product for which the intermediate menu 104 is designed. For example, product size information may not always be relevant while additional information such as a serial number or price information may be desirable in specific applications.

Figure 10:
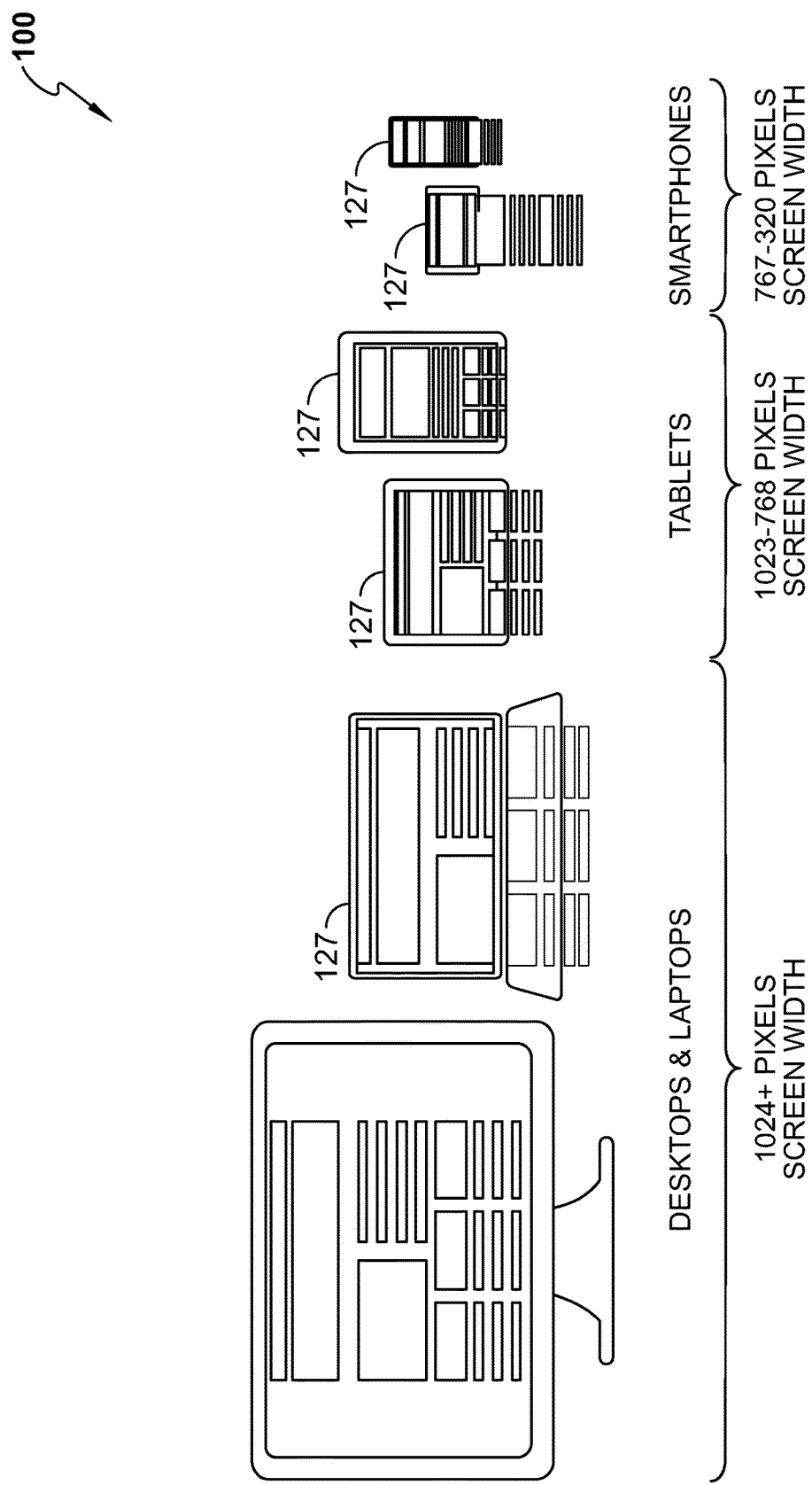
FIG. 10 is a comparison of layout responsive design screen layouts used by varying digital displays to implement an exemplary intermediate menu.
Figure 11:
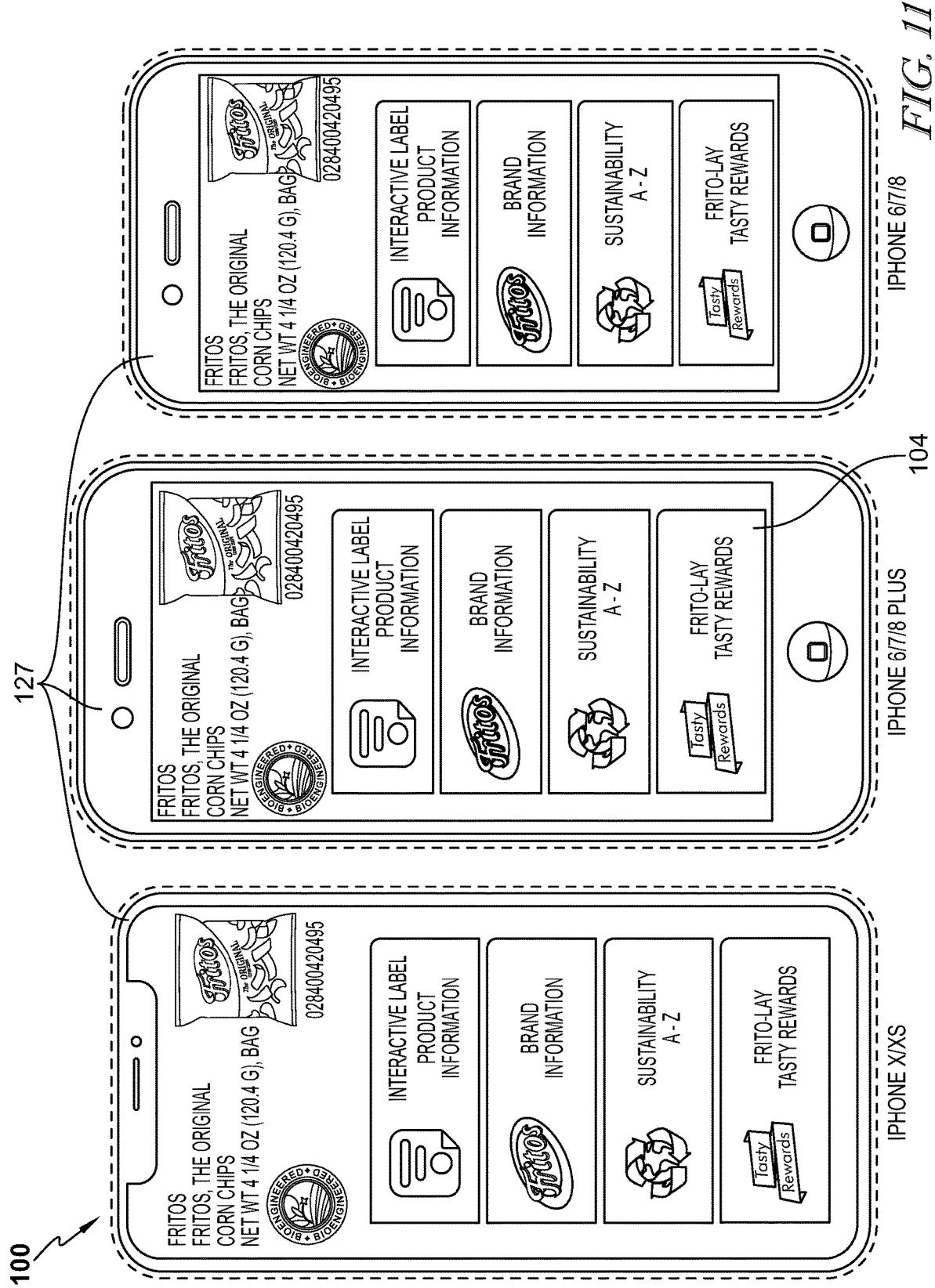
FIG. 11 is a comparison of layouts used by varying mobile device displays to implement an exemplary intermediate menu.

A comparison of responsive design screen layouts used by different computing displays to implement an example of the intermediate menu 104 is illustrated in FIG. 10. The intermediate menu 104 may be displayed on desktop and laptop monitor screens as well as on the digital displays of tablets and smartphones. Other mobile devices, such as internet of things (IoT) device screens, smart appliances, wearables (e.g, pedometers, fitness trackers, smart watches, and the like), home monitoring devices, in-vehicle entertainment systems, and/or other mobile devices having digital displays may also scale and re-arrange the screen layout of the intermediate menu 104 for appropriate display on the device. For example, vehicle mounted cameras may observe the matrix bar code 102 and display the intermediate menu 104 on an in-vehicle digital display. FIG. 11 shows a comparison of layouts used by varying popular mobile device displays to implement an example of the intermediate menu 104.

Figure 12:
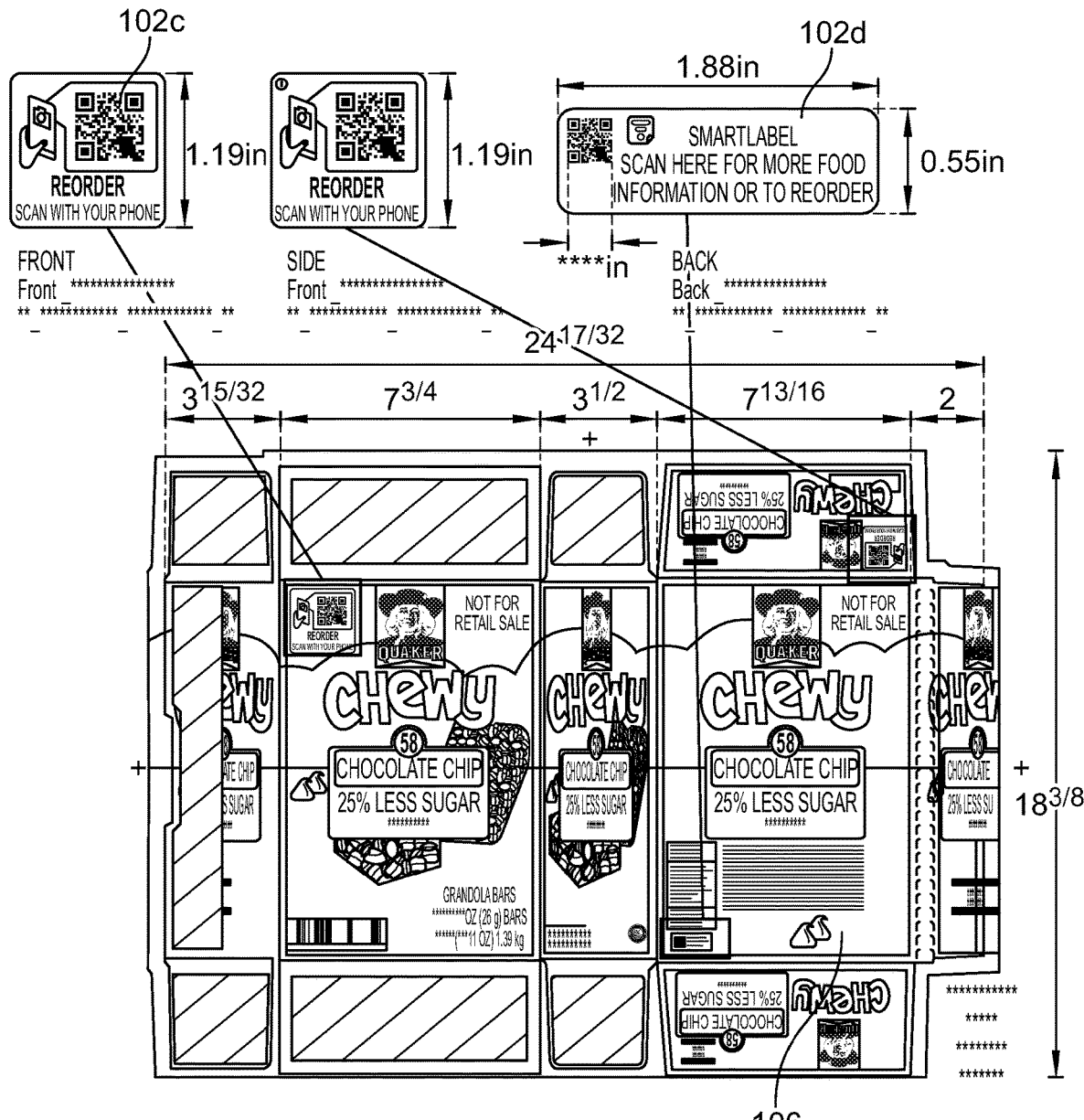
FIG. 12 illustrates exemplary locations on product packaging of another exemplary matrix bar code that redirects a user to an exemplary intermediate menu.
Figure 13:
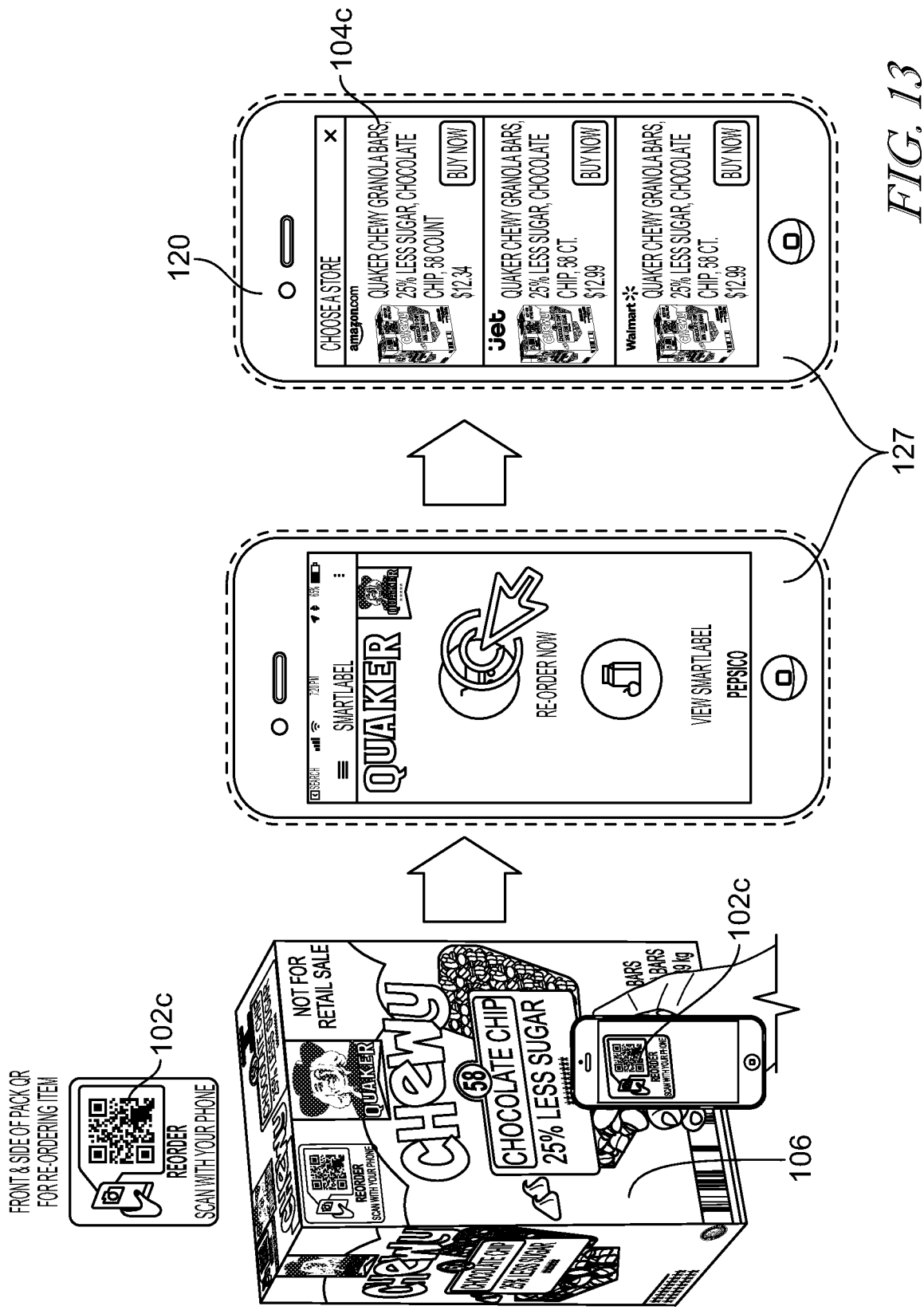
FIG. 13 illustrates steps in redirecting the user to another exemplary intermediate menu with a mobile device, e.g., a cellular telephone.
Figure 14:
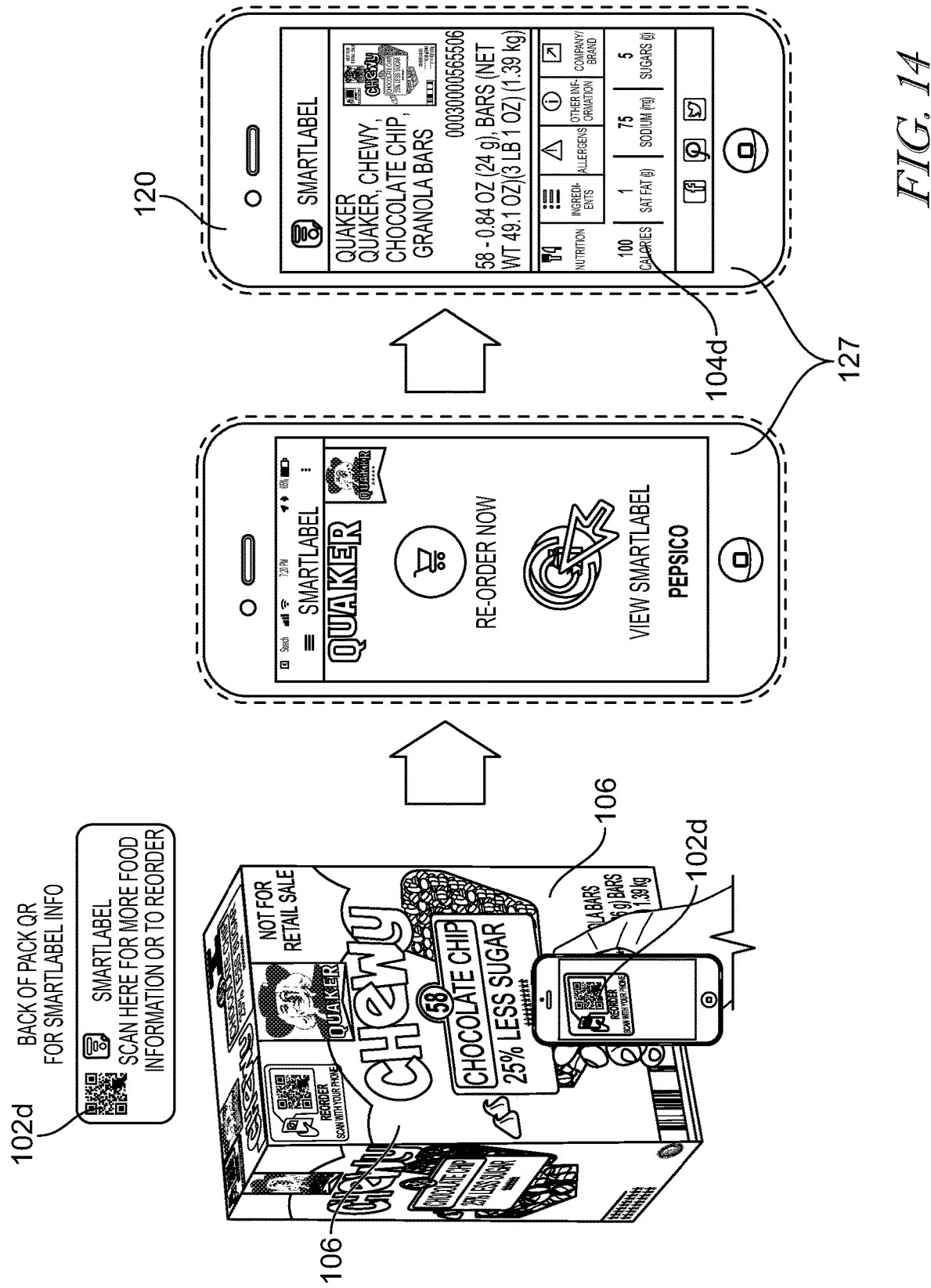
FIG. 14 illustrates steps in redirecting the user to another exemplary intermediate menu with a mobile device.

Another example of the system and method 100 for directing a user to the intermediate menu 104 via the matrix bar code 102 is described with reference to FIGS. 12-14. FIG. 12 illustrates exemplary locations on product packaging for placement of an example of the matrix bar code 102 that directs a user to the intermediate menu 104. According to this example, first and second matrix bar codes 102c, 102d are displayed on the packaging 106 of the product. The first and second matrix bar codes 102c, 102d correspond to first and second intermediate menus 104c, 104d. The first intermediate menu 104c, as shown in FIG. 13, is a dynamic landing page menu that offers item reordering. The second intermediate menu 104d, as shown in FIG. 14, is a dynamic landing page menu that presents detailed product information via an interactive label (e.g., SmartLabel®, as previously described).

Referring now to FIG. 15, exemplary embodiments of the intermediate menu 104e, 104f comprise varying layouts. As discussed with respect to FIGS. 8-10, the layout 109 of the intermediate menu 104 may be desirable for differing display screen formats or for display of varying product information and/or other interactive labels. For example, for certain products, it may be desirable for the first section 114 to be larger relative other sections of the layout 109. In the intermediate menu 104e, an appliance 121 is the subject product identified in the first section 114. In such as example, a data carrier 101e may be located on a surface of the appliance 121 or another houseware product 132, such as a washing machine. The data carrier 101e may be located on an interior or exterior surface of the appliance, for example, in a location similar to conventional serial and model number placement. Alternatively, for advertisement value, the data carrier 101e may be located in a more visible or conspicuous location. In an exemplary embodiment, the data carrier 101e may be located on an inside surface of a washing machine or dryer door.

The first section 114 of the intermediate menu 104e may display an image of the subject appliance 121 as well as information useful to a consumer or another person presented with an appliance-specific instance of the data carrier 101e (e.g., a service technician, salesperson, reseller, disposal professional, etc.). Desirable information including in the first section 114 (or the second section 116) may include a serial number, model number, supplier, manufacturer, etc. In the intermediate menu 104e of FIG. 15, an additional, more specific product identification field 117 may display a SKU/UPC number, model number, or serial number.

In an example, an owner of the subject appliance 121 may scan/read the data carrier 101e and be directed to an intermediate menu that presents the model number, serial number, brand information, and information on obtaining service for the subject appliance 121. In an exemplary embodiment, the second section of the intermediate menu 104e may comprise a consumer-controlled menu including a number of virtual buttons 110e-110j. In this example, the virtual button(s) may provide the user access to product specifications, a user manual, service and repair information, part ordering information, accessories searching, and/or compatible products (e.g., detergents compatible with a particular washing machine). The virtual button(s) of the intermediate menu 104e may vary in size and shape depending on importance. Also, in the example intermediate menu 104e the second section 116 primarily includes links that are utilitarian in character. However, one or more of the virtual buttons 110e-j of the intermediate menu 104c may instead comprise entertainment and/or advertising features. For example, in addition to a function that searches for accessories, the intermediate menu 104e for a washing machine may include a virtual button for matching dryers or upgraded new washing machine.

Referring still to FIG. 15, an intermediate menu 104f may be associated with a data carrier 101f wherein the data carrier 101f is associated with a consumer good 119, such as a garment. In this exemplary embodiment, a clothing item is shown in the first section 114 along with information regarding size, cut, brand, and/or other suitable information describing the clothing item. In such an example, the data carrier 101f may be disposed on a tag or tag location of the clothing item, or the data carrier 101f may be embedded within one or more graphics printed or woven into the clothing item. For example, a shirt may have a brand name or logo displayed on a front surface of the shirt. The data carrier 101f, particularly a digital watermark, may be embedded within the logo or brand name in a visible or concealed manner.

Again, as with appliances or housewares, it may be desirable to expand the size of the first section 114 to include a larger image of a clothing item. Further, the second section 116 may comprise a plurality of virtual buttons 110k-110o allowing a user to self-direct to product information, interactive labels, technology related to the garment, garment care instructions, style guide information, charts or specifications describing a fit of the garment, and/or company/brand news. Also, in exemplary embodiments, the data carrier 101f may be disposed on packaging or another location associated with the clothing item. For example, the data carrier 101f may be disposed on a package containing a number/count of an item, such as a package of t-shirts.

The data carrier 101 and the intermediate menu 104 may facilitate unconventional methods of shopping, advertising, and payment. The data carrier 101 is scanned (optically or by an antenna) thereby allowing a user or potential user to obtain information about a product and be presented with additional marketing, loyalty program opportunities, or other product related information without contacting the product or product packaging. Accordingly, the intermediate system and method 100 represents a contactless shopping experience and facilitates marketing interactions without the necessity of human proximity.

The embodiment(s) described above may be combined in full or in part, with any alternative embodiment(s) described.

Exemplary System Architecture

Architecturally, the representative technology may be deployed anywhere. For example, it may be preferable to host the underlying hyperlinks 112 on one or more servers accessed over the internet. The devices scanning the matrix bar codes 102 and implementing the method and/or system 100 preferably have memory and bandwidth suitable for storing and transmitting information encoded by the matrix bar codes 102 and/or requested during interaction of a user with the intermediate menu 104. Additionally, a visual display for presenting graphical user interfaces to a user is desirable, as noted above. Networking components, including network connections, between and amongst the scanning devices and servers hosting web content for the underlying hyperlinks 112 and/or the intermediate menu 104 may be wired and/or wireless and suitable for facilitating communications with the computing devices accessing the intermediate menu 104. In examples, the scanning devices and servers may communicate via cellular networks (e.g., Global System for Mobile Communications (GSM), Long Term Evolution (LTE), Universal Mobile Telecommunications System (UMTS), and/or 2G-5G networks), wireless local area networks (WLAN), wireless wide area networks (WWAN), Wi-Fi®, and/or other suitable networks or network protocols.

Embodiments of the disclosed system and method 100 are described with reference to FIGS. 1-14. In certain aspects, the system and/or method 100 may be implemented using hardware or a combination of software and hardware, either by dedicated devices and networks or integrated into other computing resource(s) or distributed across a plurality of computer resources. Computing device(s) and networks implementing the system and/or method 100 may be, for example, desktop computers, mobile computers, tablet computers (e.g., including e-book readers), mobile devices (e.g., a smartphone or personal digital assistant), set top boxes (e.g., for a television), video game consoles, or any other devices having appropriate processor, memory, and communications capabilities for gathering, storing, processing, and transmitting the data associated with the system and method 100.

The disclosed systems and methods can be implemented with a computer system, using, for example, software, hardware, or a combination of both, either in a dedicated server, or integrated into another entity, or distributed across multiple entities. An exemplary computer system includes a bus or other communication mechanism for communicating information, and a processor coupled with the bus for processing information. The processor may be locally or remotely coupled with the bus. By way of example, the computer system may be implemented with one or more processors. The processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The computer system also includes a memory, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus for storing information and instructions to be executed by processor.

According to one aspect of the present disclosure, the disclosed system can be implemented using a computer system in response to a processor executing one or more sequences of one or more instructions contained in memory. Such instructions may be read into memory from another machine-readable medium, such as data storage device. Execution of the sequences of instructions contained in main memory causes the processor to perform the process steps described herein. One or more processors in a multi-processing arrangement may also be employed to execute the sequences of instructions contained in memory. In alternative implementations, hard-wired circuitry may be used in place of or in combination with software instructions to implement various implementations of the present disclosure. Thus, implementations of the present disclosure are not limited to any specific combination of hardware circuitry and software. According to one aspect of the disclosure, the disclosed system can be implemented using one or many remote elements in a computer system (e.g., cloud computing), such as a processor that is remote from other elements of the exemplary computer system described above.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

The invention extends to methods, systems, kits of parts, and apparatus substantially as described herein and/or as illustrated with reference to the accompanying figures.

The invention extends to any novel aspects or features described and/or illustrated herein. In addition, apparatus aspects may be applied to method aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

Numerous modifications to the present disclosure will be apparent to those skilled in the art in view of the foregoing description. Preferred embodiments of this disclosure are described herein, including the best mode presently known carrying out the disclosure. It should be understood that the illustrated embodiments are exemplary only and should not be taken as limiting the scope of the disclosure.

What is claimed is:

1. A method of delivering a self-directed user experience with a food or consumable product, comprising:
    encoding access to an intermediate menu in at least one matrix bar code;
    developing the intermediate menu to facilitate a self-directed user experience, wherein the intermediate menu is developed to be presented on a computing device and has a layout that simultaneously includes
        an informational section displayed in a first portion of the layout and that displays, for each product, each of: at least one product identification, at least one brand identification, and at least one product ingredient or nutritional information, and
        a user input section displayed in a second portion of the layout entirely separate from the first portion and that is customizable depending on a product corresponding to the intermediate menu and the at least one matrix bar code;
    presenting the at least one matrix bar code to a user by placing the at least one matrix bar code on a product; and
    responsive to interaction of the user with the at least one matrix bar code, directing the user to the intermediate menu to facilitate the self-directed user experience responsive to interaction of the user with the intermediate menu,
    wherein a height and width of the informational section is dynamically determined based on the size of a display screen on which the intermediate menu is displayed, and
    wherein the user input section includes a plurality of virtual buttons configured to receive user inputs, and wherein a size of each of the plurality of virtual buttons is dynamically adapted depending upon a number and sizes of other sections of the intermediate menu being simultaneously displayed including the height and width of the informational section being simultaneously displayed.

2. The method of delivering the self-directed user experience of claim 1, wherein the computing device presents the intermediate menu responsive to optical detection of the at least one matrix bar code.

3. The method of delivering the self-directed user experience of claim 1, wherein the intermediate menu receives inputs via at least one of the virtual buttons to facilitate direction of the self-directed user experience.

4. The method of delivering the self-directed user experience of claim 1, wherein the informational section is customizable depending on a product corresponding to the intermediate menu and the at least one matrix bar code.

5. The method of delivering the self-directed user experience of claim 1, wherein the informational section and the user input section are customizable without changing the at least one matrix bar code.

6. The method of delivering the self-directed user experience of claim 1, wherein the informational section includes a plurality of header attributes, and wherein a height and width of each of the header attributes is fixed relative to a size of a display screen of the computing device that displays the intermediate menu.

7. The method of delivering the self-directed user experience of claim 1, wherein the size of each of the plurality of virtual buttons is further dynamically adapted depending upon at least one of: a size of a display screen of the computing device that displays the intermediate menu a number of links desired for a product and/or organization or one or more priorities of a manufacturer of the product.

8. The method of delivering the self-directed user experience of claim 1, wherein the intermediate menu is one of a dynamic landing page menu offering reordering of a product and a dynamic landing page menu including detailed product information via an interactive label.

9. A system for implementing a self-directed user experience with a food or consumable product, comprising:
    at least one matrix bar code corresponding to a product;
    at least one computing device comprising at least one optical sensor, wherein the at least one matrix bar code is readable by the at least one optical sensor; and
    an intermediate menu comprising product information and a plurality of virtual buttons configured to receive user inputs, wherein the at least one computing device displays the intermediate menu in response to reading the at least one matrix bar code, and wherein a layout of the intermediate menu simultaneously includes
        an informational section displayed in a first portion of the layout and that displays, for each product, each of: at least one product identification, at least one brand identification, and at least one product ingredient or nutritional information, and
        a user input section displayed in a second portion of the layout entirely separate from the first portion and that is customizable depending on a product corresponding to the intermediate menu and the at least one matrix bar code,
    wherein a height and width of the informational section is dynamically determined based on the size of the display screen on which the intermediate menu is displayed, and
    wherein a size of each of the plurality of virtual buttons is dynamically adapted depending upon a number and sizes of other sections of the intermediate menu being simultaneously displayed including the height and width of the informational section being simultaneously displayed.

10. The system for implementing the self-directed user experience of claim 9, wherein at least one virtual button of the plurality of virtual buttons directs a user to at least one of advertising information, a purchase opportunity, and a loyalty program.

11. The system for implementing the self-directed user experience of claim 9, wherein the at least one computing device is configured to receive user input in connection with at least one virtual button of the plurality of virtual buttons displayed as part of the intermediate menu.

12. The system for implementing the self-directed user experience of claim 11, wherein the user input directs the intermediate menu to customize the self-directed user experience.

13. The system for implementing the self-directed user experience of claim 12, wherein the user input directs the intermediate menu to access additional resources related to the product.

14. The system for implementing the self-directed user experience of claim 9, wherein the matrix bar code is placed on at least one of the product and the product packaging.

15. An intermediate menu system for use with a food or consumable product, comprising:
    a data carrier corresponding to an intermediate menu, wherein the intermediate menu is accessible by detecting the data carrier with at least one sensor, and wherein the intermediate menu facilitates a self-directed user experience;

a product associated with the intermediate menu, wherein the data carrier is integrated into at least one of the product and a product package; and a mobile device comprising the at least one sensor and configured to detect the data carrier and present the intermediate menu, wherein a layout of the intermediate menu simultaneously includes an informational section displayed in a first portion of the layout and that includes product information and that displays, for each product, each of: at least one product identification, at least one brand identification, and at least one product ingredient or nutritional information, and a user input section displayed in a second portion of the layout entirely separate from the first portion and including a plurality of virtual buttons linking to an interactive label and being customizable depending on a product corresponding to the intermediate menu and the at least one matrix bar code, wherein a height and width of the informational section is dynamically determined based on the size of the display screen on which the intermediate menu is displayed, and wherein a size of each of the plurality of virtual buttons is dynamically adapted depending upon a number and sizes of other sections of the intermediate menu being simultaneously displayed including the height and width of the informational section being simultaneously displayed.

16. The intermediate menu system of claim 15, wherein the mobile device presents the intermediate menu responsive to at least one of optical detection or radio frequency (RF) detection of the data carrier by the at least one sensor.

17. The intermediate menu system of claim 16, wherein the data carrier is integrated into at least one of the product and a product package.

18. The intermediate menu system of claim 17, wherein the at least one sensor detects the data carrier without making contact with the product and the product package.

* * * * *